3,578,700
PROCESS FOR PREPARING POLY (BETA-LACTONE) PREPOLYMERS

Arie Klootwijk, deceased, late of Amsterdam, Netherlands, by Johanna Maria Klootwijk, representative, Purmerend, and Willem Bergwerf and Willem M. Wagner, Amsterdam, Netherlands, assignors to Shell Oil Company, New York, N.Y.
No Drawing. Filed Mar. 29, 1968, Ser. No. 717,472
Int. Cl. C08g 17/017
U.S. Cl. 260—484                                  7 Claims

ABSTRACT OF THE DISCLOSURE

Poly(beta-lactone) prepolymers having a molecular weight of from about 200 to about 10,000 and which are especially suitable as initiators for the polymerization of poly(beta-lactones) are prepared by reacting a beta-lactone and preferably an alpha,alpha-dialkyl-beta-propiolactone with a nucleophilic agent as hereinafter more fully described such as the tertiary phosphines, in a molar ratio of 20:1 to 1:40.

BACKGROUND OF THE INVENTION

This invention relates to a process for the preparation of "living" prepolymers having a molecular weight between 200 and 10,000 and to the prepolymers so produced. The prepolymers produced by the present process are especially suitable as initiators in the polymerization of beta-propiolactones, which process is disclosed and claimed in copending U.S. patent application Ser. No. 717,394, filed Mar. 29, 1968, by Van der Plas and Wagner.

Prepolymers of beta-propiolactone are known. Thus, in Am. Chem. Soc. 73 (1951) 1371 Gresham et al. have disclosed the reaction between beta-propiolactone and trimethylamine. Similar disclosures have been made by Etienne et al. in French patent specification No. 1,326,423. On page 5, Etienne states that "unlike adducts of beta-propiolactone, the lower molecular weight adducts of amines with alpha,alpha-dialkyl-beta-propiolactones are difficult to isolate, since propagation is so much faster than initiation that high molecular weight polymers are obtained."

Nevertheless, we have found that by carefully choosing reaction conditions it is possible to obtain lower molecular weight prepolymers. We have further found that if the molecular weight of the prepolymer is within the range of 200 to 10,000, in particular between 1000 and 8000, they are "living" initiators in the polymerization of beta-lactones, in particular pivalolactone. At molecular weights much above 10,000, the initiating activity of the prepolymer drops to an unattractively low level.

SUMMARY OF THE INVENTION

This invention relates to a process for the manufacture of "living" prepolymers having a molecular weight between 200 and 10,000 by reacting an alpha,alpha-dialkyl-beta-propiolactone with a nucleophilic agent which is free of active hydrogen in a molar ratio of between 20:1 and 1:40, followed by separation of the prepolymer. The invention further relates to the prepolymers so produced which are especially suitably as initiators in the polymerization of beta-propiolactones.

DESCRIPTION OF THE PREFERRED EMBODIMENTS

The process of the instant invention is particularly applicable to the preparation of prepolymers from beta-lactones wherein the hydrogen of the beta-lactones having a tertiary or quaternary alpha-carbon atom are especially preferred. Excellent prepolymer initiators are those prepared from alpha,alpha-dialkyl-beta-propiolactone wherein the alkyl groups contain from 1 to 4 carbon atoms.

Suitable examples include alpha,alpha-dimethyl-beta-propiolactone, alpha - methyl - alpha - ethyl - beta - propiolactone, alpha - methyl - alpha - isopropoly-beta-propiolactone, alpha - ethyl - alpha-tert-butyl-propiolactone, alpha,alpha-diisopropyl-propiolactone, etc.

Thus the preferred beta-lactones have the general formula:

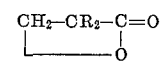

wherein R is an alkyl group containing up to 4 carbon atoms. An especially preferred beta-lactone is pivalolactone (alpha,alpha-dimethyl-beta-propiolactone).

If tertiary phosphines, stibines, arsines, amines, sulfides, or sulfoxides are used as the nucleophilic agent, a prepolymer will result upon reaction with an alpha,alpha-dialkyl-beta-propiolactone.

A typical reaction is represented by the following equation wherein R' represents an alkyl or aryl radical such as a phenyl or butyl radical and R represents an alkyl group containing from 1 to 4 carbon atoms:

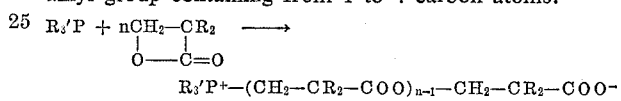

It will be appreciated that the above equation is directed to the use of tertiary phosphines but may be appropriately modified when the nucleophilic agent is a tertiary stibine, arsine, amine, etc.

If, on the other hand, an alkali metal salt of an organic or inorganic acid; an alkali metal hydroxide, -hydrosulfide, -phenolate, -thiophenolate, -alcoholate or -mercaptide; an alkali metal alkyl or aryl; a quaternary phosphonium, stibonium, arsonium, ammonium; or a tertiary sulfonium salt of an organic or inorganic acid is used as the nucleophilic agent, a prepolymer which is not a betaine may be formed, as, for example:

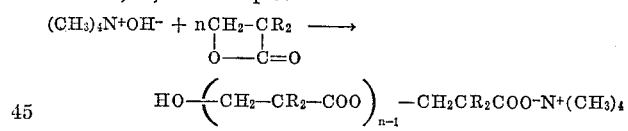

wherein R is an alkyl group containing from 1 to 4 carbon atoms.

Examples of such suitable nucleophilic agents include lithium bromide, potassium iodide, sodium acetate, sodium stearate, potassium pivalate, sodium hydroxide, lithium hydrosulfide, potassium cresolate, dibutylsulfide, dimethylsulfoxide, trimethylsulfonium iodide, trimethyl amine, tetramethylammonium laurate, tributylphosphine, triphenyl arsine, methyldiethylstibine, tetrabutylphosphonium bromide, lithium butyl, sodium naphthalene and the like. Preferred nucleophilic agents are the tertiary phosphines, stibines and arsines.

In order to obtain the prepolymer, the alpha,alpha-dialkyl-beta-propiolactone and nucleophilic agent are reacted in a molar ratio between 20:1 and 1:40, preferably between 4:1 and 1:10. Advantageously, the lactone is added to the nucleophilic agent so as to ensure that at any time during the reaction the molar ratio will not be too high.

The reaction is suitably carried out in a liquid, inert diluent, though gaseous diluents may be used, if desired, e.g., in a fluid-bed-type reactor. As used herein, the term "liquid" refers to the liquid state under the reaction conditions. Suitable diluents include, for example, hydrocarbons, ethers, esters, and halogenated hydrocarbons. It should be remembered, however, that strongly basic nucleophilic agents, such as NaOH, may not be inert towards esters and halogenated hydrocarbons. Preferred diluents are the hydrocarbons boiling below 300° C. at atmospheric pressure.

The reaction between the lactone and the nucleophilic agent is generally carried out at temperatures between 0 and 200° C., preferably between 10 and 150° C.

If liquid diluents, in particular liquid hydrocarbons, are used in the reaction, the prepolymer will usually separate therefrom after some time by precipitation in the form of a fine powder. It is usually necessary to allow the reaction mixture to stand for at least 5 to 60 minutes after the addition of the reaction components so as to have the prepolymer separated as completely as practically possible. The reaction mixture may be gently stirred during this period. Thereupon the prepolymer may be filtered, centrifugated, decanted, spray-dried or the like, and may subsequently be washed, if desired, e.g., with a volatile solvent, such as pentane. Washing is more desirable if the prepolymer is not a betaine. If in certain solvents, such as esters or halohydrocarbons, the solubility of the preploymer is too high, precipitation may be promoted by addition of suitable ethers or liquid hydrocarbons. The reaction mixture from which the prepolymer has precipitated may be used as such, though it is preferable to separate the prepolymer from the diluent used in the reaction.

The following examples are presented in order to illustrate the process of the invention. Unless otherwise specified, parts are given by weight.

EXAMPLE I

To a boiling solution of 157 g. (0.6 mole) of triphenyl phosphine in 540 ml. of 1,2-dimethoxyethane was added 10 g. (0.1 mole) of pivalolactone. The mixture was refluxed for 1¾ hours. After cooling to room temperature, the prepolymer was filtered, washed with ether, and dried. The yield was 8.5 g., and the phosphorus content was 0.36%, corresponding to a molecular weight of 8600. The molecular weight determined with the aid of gel permeation chromatography was 7200.

EXAMPLE II

To a boiling solution of 524 g. (2.0 moles) of triphenyl phosphine in 1800 ml. of 1,2-dimethoxyethane was added 20 g. (0.2 mole) of pivalolactone, after which the liquid was refluxed for 1¾ hours. After cooling to room temperature, the prepolymer was filtered and washed with ether to give 17.5 g. of product having a phosphorus content of 0.46%, corresponding to a molecular weight of 6740.

EXAMPLE III

To a solution of 30 g. (0.115 mole) of triphenyl phosphine in 50 ml. of chloroform was added dropwise at room temperature in half an hour's time 2 ml. (0.002 mole) of pivalolactone. After standing at −10° C. for 2 days, the prepolymer had precipitated and was filtered and washed with $CS_2$. The yield was 1.5 g., and the molecular weight according to the phosphorus content (1.60%) was 1900.

EXAMPLE IV

To a solution of 323 g. (1.6 moles) of tributyl phosphine in 960 ml. of dimethoxyethane was added at room temperature 20 g. (0.2 mole) of pivalolactone, after which the liquid was stirred for 3 hours. After standing overnight at −10° C., the prepolymer was filtered and washed with pentane; yield, 21 g. The phosphorus content was 1.29%, corresponding to a molecular weight of 2400. The molecular weight determined by the gel permeation chromatography method was 3200.

EXAMPLE V

To a solution of 60.6 g. (0.3 mole) of tributyl phosphine in 180 ml. of dimethoxyethane was added at room temperature 30 g. (0.3 mole) of pivalolactone. The mixture was subsequently stirred for 3 hours and stored overnight at −10° C. Filtration yielded 30 g. of prepolymer having a phosphorus content of 0.49%, corresponding to a molecular weight of 6300.

EXAMPLE VI

A mixture of 2.62 g. of triphenyl phosphine (0.01 mole), 1 g. (0.01 mole) of pivalolactone and 9 ml. of aviation alkylate was stirred under reflux for 20 minutes. Filtration yielded 1 g. of prepolymer.

EXAMPLE VII

To a boiling solution of 2.6 g. (0.03 mole) of LiBr in 270 ml. of dimethoxyethane was added 30 g. (0.3 mole) of pivalolactone, after which the solution was refluxed for 1 hour. After storage overnight at −10° C., the prepolymer was filtered. The yield was 4.9 g. and the molecular weight determined with the aid of the vapor pressure method was 1830.

EXAMPLE VIII

To a solution of 15.8 g. (0.05 mole) of tetrabutyl phosphonium bromide in 84 ml. of dimethoxyethane were added at room temperature 9.3 g. (0.093 mole) of pivalolactone. The mixture was stirred for 80 minutes, stored overnight at −10° C. and filtered. The yield on prepolymer was 14.7 g., and the molecular weight determined by the vapor pressure method was 420.

EXAMPLE IX

To a boiling solution of 92.5 g. (0.5 mole) of tri-n-butylamine in 95 ml. of dimethoxyethane were added 10 g. (0.1 mole) of pivalolactone. The mixture was refluxed for 1 hour, cooled to room temperature, and filtered. The yield was 5 g., the molecular weight according to the nitrogen content (0.39%), 3600.

EXAMPLE X

To a boiling solution of 1.4 g. of anhydrous potassium pivalate in 90 ml. of dimethoxyethane was added 10 g. (0.1 mole) of pivalolactone. The mixture was refluxed for 2 hours and, after cooling to room temperature, filtration yielded 4 g. of prepolymer.

EXAMPLE XI

A solution of 3 g. (0.03 mole) of pivalolactone in 50 ml. of chloroform was, in half an hour's time, added dropwise to a solution of 55 g. (0.2 mole) of triphenylphosphine in 50 ml. of chloroform at room temperature with stirring. After standing overnight at room temperature, half of the chloroform was evaporated on the stream bath and after cooling to room temperature 200 ml. of ether was added. The precipitate was filtered, washed with ether and dried. Yield: 2.7 g.; phosphorus content: 6.7%, corresponding to a molecular weight of 460; molecular weight according to the vapor pressure method: 405.

EXAMPLE XII

A solution of 26.3 g. (0.1 mole) of triphenyl phosphine and 8.35 g. (0.12 mole) of beta-propiolacetone in 90 ml. of 1,2-dimethoxyethane was refluxed for 2.5 hours. After standing overnight, 6.5 g. of prepolymer having a molecular weight of 1900 was obtained.

EXAMPLE XIII

This example illustrates the effectiveness of the instant prepolymers as initiators for the polymerization of beta-lactones.

To a stirred suspension of 1 g. of the prepolymer prepared in Example I in 200 ml. of aviation alkylate (boiling point 100° to 170° C.), 100 g. of pivalolactone were added dropwise at 100° C. for 2 hours. The mixture was kept at 100° C. for 18 hours. Filtration yielded 88 g. of polymer, bulk density 0.40 g./ml., intrinsic viscosity 4.3 dl./g. (measured in trifluoroacetic acid at 25° C.). No reactor fouling occurred and no difficulties with stirring of the polymerization mixture were encountered.

When under the same conditions a comparative polymerization experiment was undertaken in which the prepolymer initiator was replaced by 1 g. (0.004 mole) of triphenyl phosphine, the viscosity of the reaction mixture became too high for stirring after 3-4 hours, preventing adequate working up. In order to obtain a stirrable reaction mixture, the amount of pivalolactone had to be reduced from 100 g. to 15 g. Under the same conditions (employing 150 mg. of triphenylphosphine), a polymer resulted having a bulk density of 0.1 g./ml. and an intrinsic viscosity of 4.0 dl./g. The stirrer and reactor walls were covered with polymer which could only be removed with difficulty.

We claim as our invention:

1. A process for preparing poly(beta-lactones) having a molecular weight between 200 and 10,000 and which are suitable as polymerization initiators for beta-lactones which comprises reacting a beta-lactone with a nucleophilic agent which is free of active hydrogen selected from the group consisting of tertiary phosphines, stibines and arsines having the formula $R_3'P$, $R_3'As$ or $R_3'Sb$ where $R'$ is an alkyl or aryl radical in the molar ratio of beta-lactone to nucleophilic agent of between 4:1 and 1:10.

2. A process as in claim 1 wherein the beta-lactone has the general formula

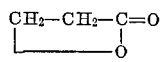

wherein R is an alkyl group containing 1 to 4 carbon atoms.

3. A process as in claim 2 wherein the beta-lactone is pivalolactone.

4. A process as in claim 1 wherein the reaction is carried out in an inert liquid diluent.

5. A process as in claim 4 wherein the diluent is a hydrocarbon boiling below 300° C.

6. A process as in claim 1 wherein the reaction is performed between 10° and 150° C.

7. A process as in claim 1 wherein the tertiary phosphine is triphenyl phospine.

References Cited

UNITED STATES PATENTS

| 3,412,073 | 11/1968 | Hogsed | 260—78.3 |

FOREIGN PATENTS

| 766,347 | 1/1957 | Great Britain | 260—78.3 |
| 1,016,394 | 1/1966 | Great Britain | 260—78.3 |
| 1,017,669 | 1/1966 | Great Britain | 260—78.3 |
| 1,128,137 | 9/1968 | Great Britain | 260—78.3 |
| 791,524 | 4/1960 | France | 260—78.3 |
| 736,566 | 4/1966 | Canada | 260—78.3 |
| 1,231,163 | 9/1960 | France | 260—78.3 |

WILLIAM H. SHORT, Primary Examiner

E. A. NIELSEN, Assistant Examiner

U.S. Cl. X.R.

260—78.3